United States Patent
Hung et al.

(10) Patent No.: US 7,613,012 B2
(45) Date of Patent: Nov. 3, 2009

(54) STANDING APPARATUS FOR ELECTRICAL COMPONENTS

(75) Inventors: Yu-Feng Hung, Taipei Hsien (TW); Chen-Lu Fan, Taipei Hsien (TW); Li-Ping Chen, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 121 days.

(21) Appl. No.: 11/849,308

(22) Filed: Sep. 3, 2007

(65) Prior Publication Data

US 2009/0052151 A1   Feb. 26, 2009

(30) Foreign Application Priority Data

Aug. 24, 2007   (CN)   .................... 2007 2 0200878 U

(51) Int. Cl.
*H05K 7/02* (2006.01)
(52) U.S. Cl. .................. 361/809; 361/810; 361/803
(58) Field of Classification Search .................. 361/807, 361/809, 810; 174/138 G, 138 E
See application file for complete search history.

(56) References Cited

U.S. PATENT DOCUMENTS

| | | | | |
|---|---|---|---|---|
| 3,117,611 A | * | 1/1964 | Matthews | ................... 411/103 |
| 3,362,737 A | * | 1/1968 | Cobb | ......................... 403/373 |
| 5,541,377 A | * | 7/1996 | Stuhlmacher | ............... 200/296 |
| 5,620,290 A | * | 4/1997 | Homfeldt et al. | ............ 411/533 |
| 5,833,422 A | * | 11/1998 | Haga et al. | .................. 411/526 |
| 6,424,538 B1 | * | 7/2002 | Paquin | ........................ 361/752 |
| 7,028,389 B2 | * | 4/2006 | Chang | .......................... 29/739 |
| 7,052,291 B2 | * | 5/2006 | Barina et al. | .................. 439/92 |
| 2003/0206767 A1 | * | 11/2003 | Lecuppe | ..................... 403/188 |

* cited by examiner

*Primary Examiner*—Hung S Bui
(74) *Attorney, Agent, or Firm*—D. Austin Bonderer

(57) ABSTRACT

A standing apparatus for mounting electrical components to a base plate (10), the standing apparatus includes the base plate, a standing member (20), and a clamping member (30). The base plate defines a recess (12) in a first face, and a hole (14) extends through the recess to a second face opposite to the first face. The standing member includes a positioning collar (22) and a standing pillar (24). The standing pillar has a groove (242). The clamping member includes a base portion (32) and a domelike portion (34), the domelike portion has a plurality of spring clips (36), the spring clips encircling the standing pillar and received in the groove of the standing member for retaining the standing member to the base plate.

16 Claims, 4 Drawing Sheets

STANDING APPARATUS FOR ELECTRICAL COMPONENTS

BACKGROUND

1. Field of the Invention

The present invention relates to a standing apparatus, particularly to a standing apparatus for mounting electrical components to a base plate.

2. Description of Related Art

A number of different means and apparatus are used to mount an electrical component to a base plate. One widely used means is to integrally form a base plate having a support plate from a sheet of metal. An electrical component is then attached to the support plate by a plurality of screws. A significant drawback of this means is that the insertion and removal of screws is cumbersome and time consuming. Particularly since the typical base plate has limited working space and accessibility. In addition, a tool such as a screwdriver is usually required. Moreover, the electrical component is prone to be damaged if the tool slips during manipulation of the screws. More recent developments have yielded other means for facilitating installation and removal of an electrical component. These include the use of removable support plates. For example, U.S. Pat. No. 5,145,243 discloses a mounting apparatus that does not require screws to secure a support plate to a base plate. The apparatus makes assembly of the support plate into the base plate simple, but at the expense of having a substantial amount of additional components and a complex configuration of the fastening structure itself.

Moreover, an example of attachment of an electrical component to such a removable support plate is shown in CN Pat. No. 00201452.1. The electrical component defines a plurality of holes therein. The support plate comprises a plurality of protruding portions corresponding to the holes of the electrical component, and each protruding portion defines an opening therein. Screws extend through the holes of the electrical component and the openings of the support plate and screw the electrical component to the support plate. Using the screws will still cost time and be cumbersome during the attachment and removal procedures. Thus, a mounting apparatus for an electrical component, which solves the above-mentioned problems, is strongly desired.

What is needed, therefore, is a standing apparatus for an electrical component which may be easily and securely operated.

SUMMARY

A standing apparatus for mounting electrical components to a base plate, the standing apparatus includes the base plate, a standing member, and a clamping member. The base plate defines a recess in a first face, and a hole extends through the recess to a second face opposite to the first face. The standing member includes a positioning collar received in the recess and a standing pillar extends through the base plate via the recess and the hole thereof, the standing pillar has a groove. The clamping member includes a base portion and a raised portion therefrom, the raised portion has a plurality of spring clips, the spring clips encircling the standing pillar and received in the groove of the standing member for retaining the standing member to the base plate.

Other advantages and novel features of the present invention will become more apparent from the following detailed description of a preferred embodiment when taken in conjunction with the accompanying drawings, in which:

DETAILED DESCRIPTION

Figure 1:
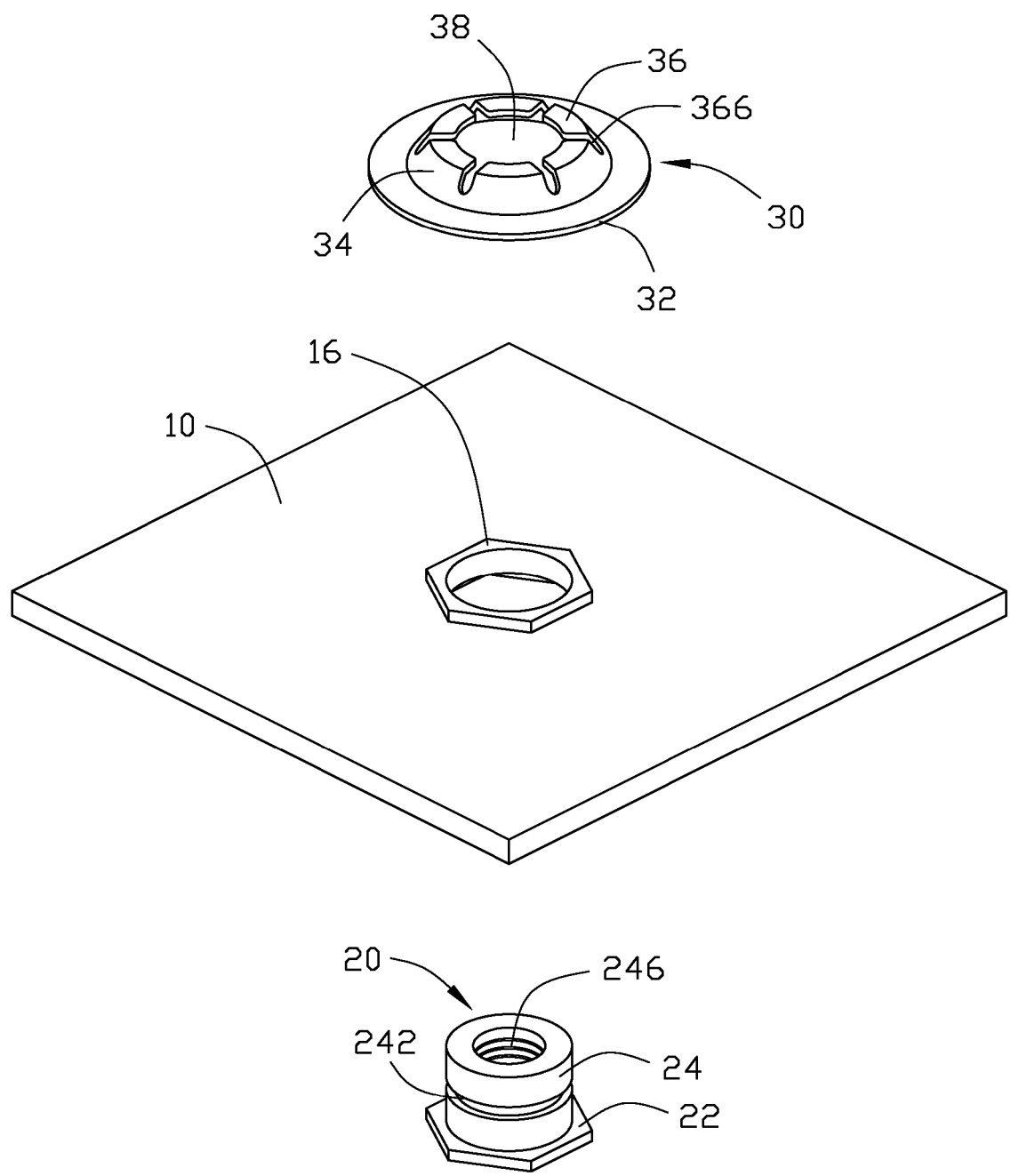
FIG. 1 is an exploded, isometric view of a standing apparatus for mounting electrical components to a base plate in accordance with a preferred embodiment of the present invention, the standing apparatus including a base plate, a clamping member, and a standing member.
Figure 2:
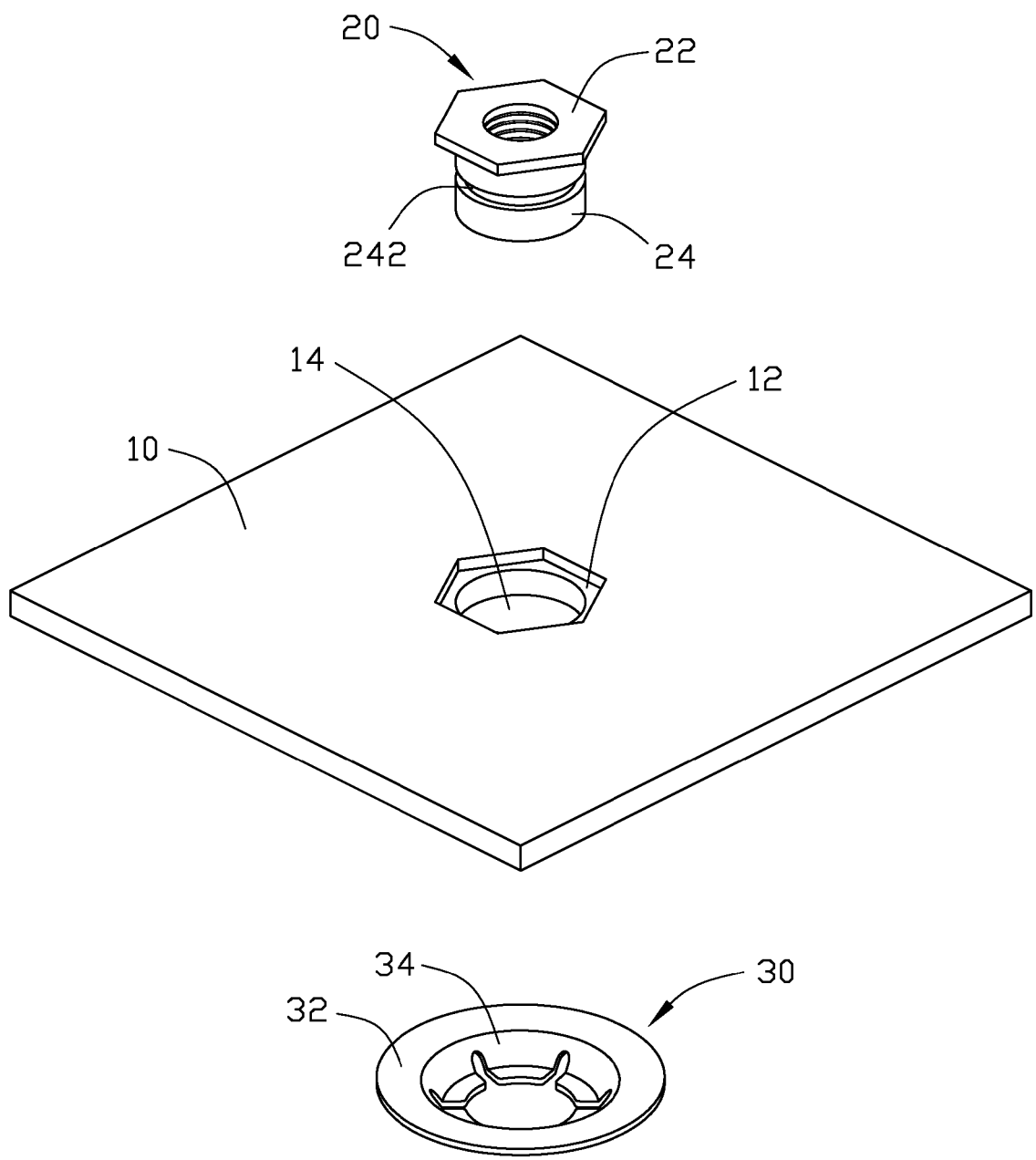
FIG. 2 is an another exploded view of the standing apparatus of FIG. 1

Referring to FIG. 1 and FIG. 2, a standing apparatus for mounting electrical components to a base plate. The standing apparatus includes a base plate 10, a standing member 20, and an annular-shaped clamping member 30. The base plate 10 includes a hexagon-shaped recess 12 in a first face, and a hole 14 extending through the recess 12 to a second face opposite to the first face. The base plate 10 has a protuberant portion 16 formed on the second face thereof. The standing member 20 includes a hexagon-shaped positioning collar 22 and a standing pillar 24 extending through the base plate 10 via the hole 14 in the recess 12. The depth of the recess 12 is not less than the thickness of the positioning collar 22. The standing pillar 24 defines an annular groove 242 at a middle portion thereof, and a threaded hole 246 defined therein. The clamping member 30 includes a ring-shaped base portion 32 and an open-topped domelike portion 34 rising therefrom. The domelike portion 34 has a plurality of spring clips 36 separated by slits 366. Each spring clip 36 comprises an inclined stem and a horizontal free end. The spring clips 36 encircle the standing pillar 24 and are received in the groove 242 of the standing member 20 for retaining the standing member 20 to the base plate 10. The open top of the domelike portion 34 is called a circular opening 38. The base portion 32 of the clamping member 30 abuts against the second face of the base plate 10, and a space remains between the domelike portion 34 and the base plate 10.

Figure 3:
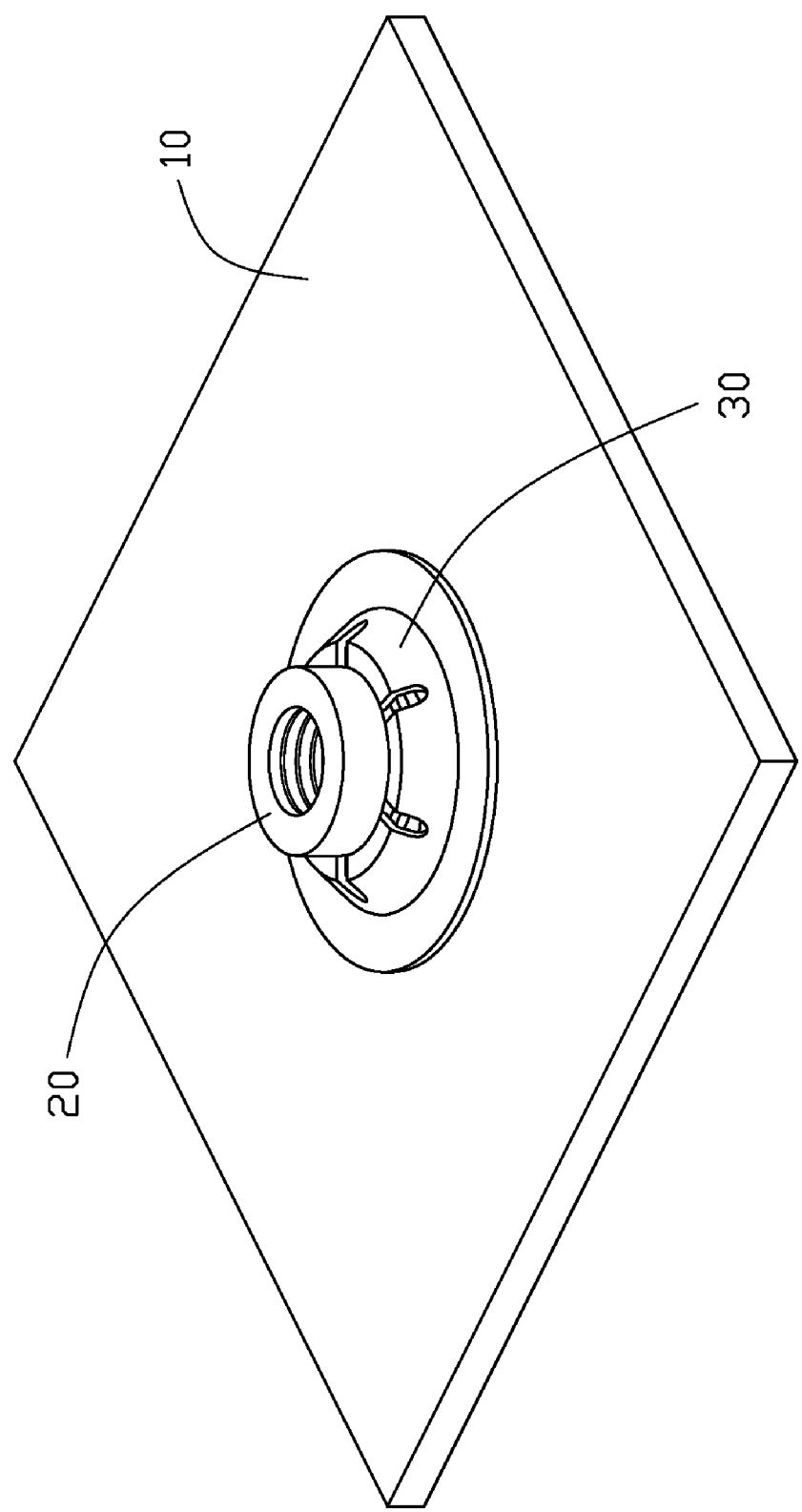
FIG. 3 is an assembled view of the standing apparatus of FIG. 1.

Referring also to FIG. 3, when assembling the standing apparatus, the standing pillar 24 of the standing member 20 is inserted through the hole 14 of the base plate 10. The positioning collar 22 is received in the recess 12. The clamping member 30 is placed on the standing pillar and slid down causing the spring clips 36 to deform upwardly until received in the groove 242, at which point the spring clips 36 rebound and clamp therein. The clamping member 30 securely clamps the standing member 20.

Figure 4:
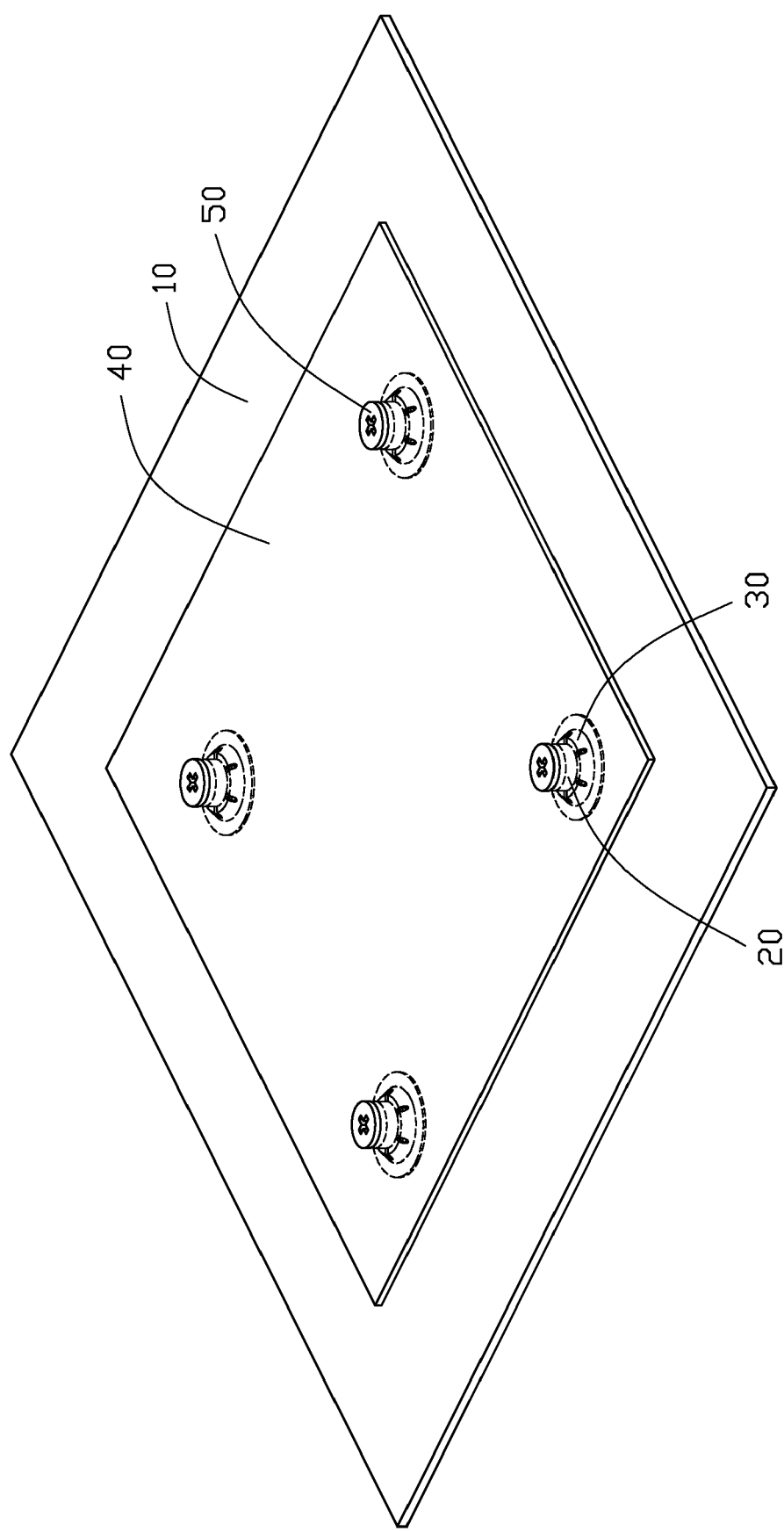
FIG. 4 is an assembled view of the standing apparatus for mounting a mainboard to the base plate.

Referring also to FIG. 4, a mainboard 40 mounted to the base plate 10 is shown. The mainboard 40 has a locking hole in each corner thereof. The mainboard 40 is positioned on the base plate 10 with each locking hole aligned with the corresponding standing pillar 24. Then a screw 50 is fastened in the threaded hole 246 through the mainboard 40. Thus, the mainboard 40 is mounted to the standing member 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts to the principles of the invention to the full extent indicated by the broad general meaning of the terms in which the appended claims are expressed.

What is claimed is:

1. A standing apparatus for mounting electrical components to a base plate, the standing apparatus comprising:
   a base plate defining a recess in a first face, and a hole extending through the recess to a second face opposite to the first face, the base plate having a hexagon-shaped protuberant portion formed on the second face thereof, and the hole extending through the protuberant portion;
   a standing member comprising a positioning collar received in the recess and a standing pillar extending through the base plate via the hole in the recess thereof, the standing pillar having a groove; and
   a clamping member comprising a base portion and a domelike portion therefrom, the domelike portion having a plurality of spring clips, the spring clips encircling the standing pillar and received in the groove of the standing member for retaining the standing member to the base plate.

2. The standing apparatus as described in claim 1, wherein a circular opening is defined in the domelike portion.

3. The standing apparatus as described in claim 1, wherein the base portion of the clamping member abuts against the second face of the base plate, and a space remains between the domelike portion and the base plate.

4. The standing apparatus as described in claim 1, wherein the recess and the positioning collar are hexagon-shaped.

5. The standing apparatus as described in claim 1, wherein the base portion and the domelike portion are circular.

6. The standing apparatus as described in claim 1, wherein each spring clip comprises an inclined stem and a horizontal free end.

7. The standing apparatus as described in claim 1, wherein the standing pillar is hollow with thread defined therein, and a screw is threadedly engaged in the standing pillar.

8. The standing apparatus as described in claim 1, wherein the groove is formed in a middle portion of the standing pillar and is annular-shaped.

9. A retaining assembly for mounting a mainboard to a base plate, the standing apparatus comprising:
   a mainboard having a locking hole defined therein;
   a base plate for mounting the mainboard, the base plate defining a hole corresponding to the locking hole;
   a standing member comprising a positioning collar blocking on one side of the base plate and a standing pillar extending through the locking hole of the base plate, the standing pillar is hollow and has a groove;
   a clamping member comprising a ring-shaped base portion and at least one spring clip extending from an edge of the base portion and clamping in the groove, each spring clip comprising an inclined stem and a horizontal free end; and
   a fastener extending through the locking hole and received in the hollow standing member.

10. The retaining assembly as described in claim 9, wherein a circular opening is defined in the base portion, at least a slit being defined adjacent each side of the at least one spring clip.

11. The retaining assembly as described in claim 9, wherein the base portion of the clamping member abuts against the second face of the base plate, and a space remains between the base portion and the base plate.

12. The retaining assembly as described in claim 9, wherein the base plate further has a recess, the recess receiving the positioning collar of the standing member.

13. The retaining assembly as described in claim 12, wherein the recess and the positioning collar are hexagon-shaped.

14. The retaining assembly as described in claim 9, wherein the base portion is annular.

15. The retaining assembly as described in claim 9, wherein the hollow standing pillar is threaded therein, and a screw is threadedly engaged in the hollow standing pillar.

16. The retaining assembly as described in claim 9, wherein the groove is formed in a middle portion of the standing pillar and is annular-shaped.

* * * * *